Patented Mar. 1, 1932

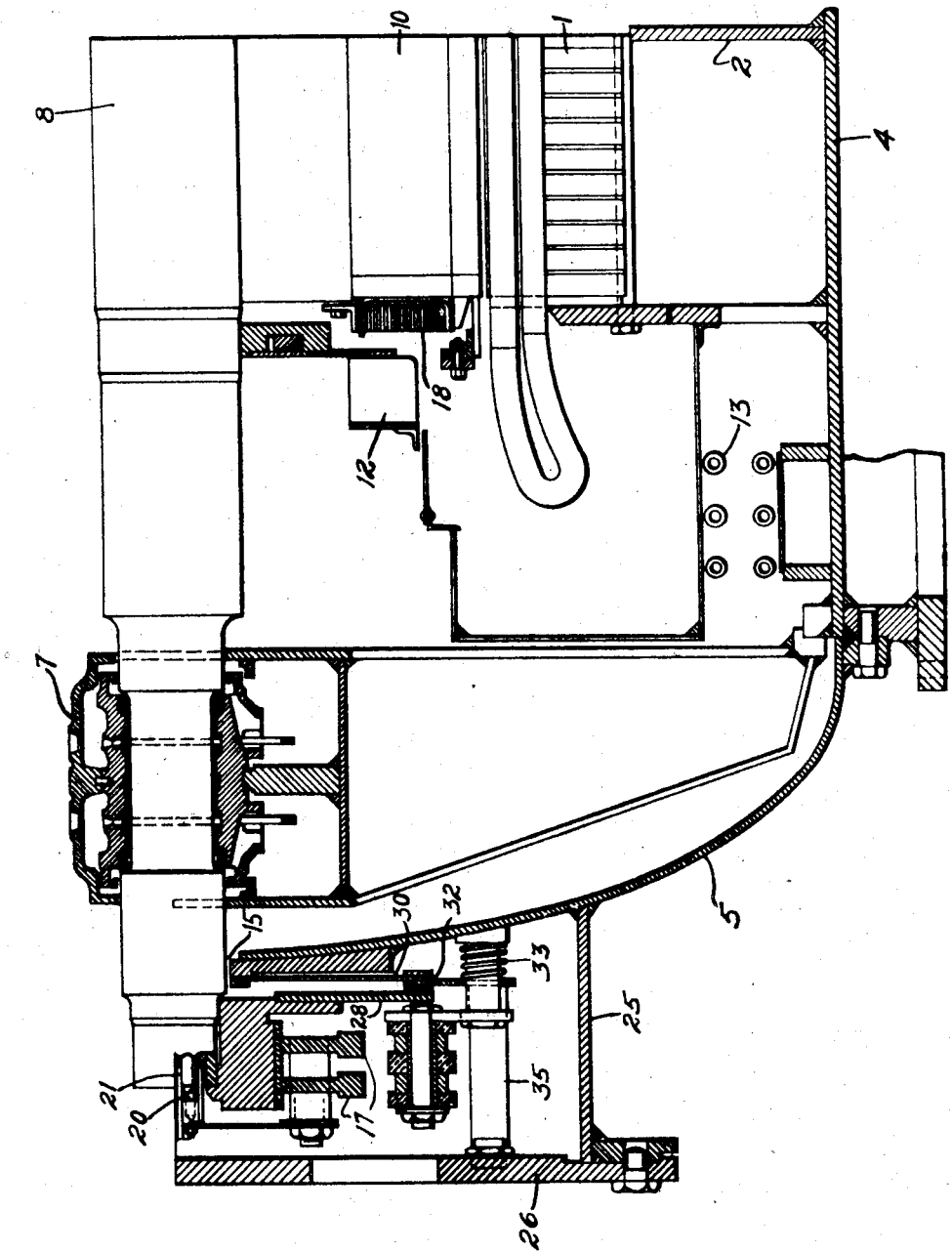

1,847,207

UNITED STATES PATENT OFFICE

RENÉ A. M. BAUDRY, OF WILKINSBURG, AND CARL J. FECHHEIMER, OF PITTSBURGH, PENNSYLVANIA, ASSIGNORS TO WESTINGHOUSE ELECTRIC AND MANUFACTURING COMPANY, A CORPORATION OF PENNSYLVANIA

DYNAMO-ELECTRIC MACHINE

Application filed January 30, 1931. Serial No. 512,260.

Our invention relates to dynamo-electric machines and particularly to hydrogen seals for permitting inspection or repair of a portion of hydrogen-cooled machines without the necessity of scavenging the entire apparatus.

In dynamo-electric machines, certain portions, such as the current-collecting devices, including slip rings, brushes, etc., require more or less frequent inspection and replacement. Prior to our invention, hydrogen-filled machines were necessarily completely scavenged before the machines were opened for such inspection or replacement.

It is an object of our invention to provide a hydrogen-cooled machine in which the current-collecting mechanism may be inspected without disturbing the gas filling of the main portion of the machine.

It is a further object of our invention to provide a machine in which the main portions, such as the stator and rotor, together with the bearings therefor, are enclosed in a substantially explosion-proof casing, and the current-collecting devices for the rotor are enclosed in an auxiliary casing having gas passages in communication with the main casing and a sealing device for automatically closing the gas passages between the main and the auxiliary chambers, whenever the auxiliary chamber is opened for any reason.

Further objects and advantages of our invention will be apparent from the following detailed description, taken in conjunction with the accompanying drawing, in which The single figure is a fragmentary sectional elevation of a dynamo-electric machine embodying our invention.

The apparatus disclosed in the drawing comprises a stator 1 of any desired construction, mounted in a fabricated frame 2, the whole being enclosed in a substantially cylindrical outer frame member 4, each end of the cylindrical member being closed by a convex member 5, similar to a boiler head, and the whole forming a substantially explosion-proof casing about the machine. Enclosed within the casing are suitable bearings 7 for supporting a rotor shaft 8. The rotor 10 is preferably provided with a suitable blower 12 for circulating a cooling fluid, such as hydrogen, through the machine. A cooler 13 of suitable construction is provided within the casing to maintain the cooling fluid at the desired temperature.

A portion of the shaft 8 extends through an opening 15 in the main casing and has mounted thereon, outside of the main casing, a current-collecting device of any desired type; in this instance, a plurality of slip rings 17 and cooperating brushes. The slip rings 17 are connected to the rotor windings 18 by suitable connections 20 extending through an opening or openings 21 in the shaft 8. The openings around the connectors are filled with suitable cement, not only to maintain the connectors in position, but to seal the opening so that gas may not escape either into or out of the machine along the connectors. The end of the shaft and the associated current-collecting devices are enclosed in an auxiliary gas-tight chamber 25; preferably, of cylindrical construction, and secured directly to the main enclosure.

The auxiliary casing 25 is provided with a suitable closure or cover 26 which may be readily removed to permit inspection or replacement of the current-collecting devices.

In order to provide proper ventilation of the auxiliary chamber, a suitable passage is provided between the main and the auxiliary casings; preferably, this passage will be concentric with the shaft of the machine. To close the passage, I provide a novel closure member which consists of a disc or flange 28 in gas-tight relation or integral with the shaft 8, and an annular flexible diaphragm 30 having one edge secured in gas-tight relation to the main casing. The other edge of the diaphragm is provided with a sealing ring 32 adapted to make a gas-tight joint with the flange 28 on the shaft 8. A plurality of resilient spring members 33 are provided to bias the diaphragm to sealing position, so that, when the springs are unopposed, the sealing member 32 will be in contact with the flange 28 to prevent circulation or leakage of gas, either into, or out of, the main casing. However, when the machine is in operation, it is necessary that the sealing member should be in open position both to eliminate friction and to allow substantially free circulation of the cooling medium between the main and the auxiliary enclosures. To insure that the diaphragm will be in open position when the machine is in condition for operation, and in closed position when the cover has been removed from the auxiliary chamber, it is desirable to interlink the cover of the chamber and the sealing diaphragm. For this purpose, I have provided the cover 26 with inwardly extending substantially rod-like members 35 adapted to make contact with a portion of the diaphragm 30, and of such a length that, when the cover is placed in position, the rod members 35 will compress the resilient elements 33 and force the diaphragm 30 to open position, so that, when the cover is in place, the diaphragm will be maintained in open position, and, when the cover is removed, the diaphragm will be automatically moved to closing position.

The use of our device enables the operator to inspect or replace the current-collecting devices without disturbing the cooling fluid in the main portion of the machine, and without the loss of hydrogen or the use of a scavenging element, as was necessary when the current collectors were enclosed in the main frame of the machine or if there was no sealing element between current-collecting devices and the main frame of the machine.

While we have shown and described a specific embodiment of our invention, it is apparent that changes and modifications can be made therein without departing from the spirit and scope of our invention. We desire, therefore, that only such limitations shall be imposed, as are indicated in the appended claims, or as may be necessitated by the prior art.

We claim as our invention:

1. In a hydrogen-cooled dynamo-electric machine having a stator and a rotor, a gas-tight enclosure for said machine, a secondary enclosure enclosing a current-collecting device for said machine, there being a passage between said enclosures, a diaphragm adapted to close said passage, resilient means for biasing said diaphragm to closing position, a removable closure for said secondary enclosure, and means on said closure for maintaining said diaphragm in open position when said closure is in place.

2. A ventilating housing for a dynamo-electric machine comprising a main casing for the machine, an auxiliary casing having a passage communicating with said main casing, a closure for said passage, means urging said closure to closing position, a removable cover for said auxiliary casing, and means on said cover for maintaining said closure in open position when said cover is in place.

3. In a hydrogen-cooled dynamo-electric machine, a main casing for said machine, a shaft for said machine, said shaft extending outside said main casing, an auxiliary casing enclosing the portion of said shaft extending beyond said main casing, a current-collecting device on said shaft extension, a removable cover for said auxiliary casing to permit inspection of said current-collecting device, a passage between said casings, a seal for said passage comprising a flange on said shaft, a diaphragm having one edge secured to said casing, a sealing ring on said diaphragm adapted to make sealing contact with said flange, spring means for urging said diaphragm to closing position, and means on said removable cover for maintaining said diaphragm in open position when said cover is in place.

4. A dynamo-electric machine comprising a stator and a rotor, a casing surrounding said stator, a shaft for supporting said rotor, a current-collecting device on said shaft, an electrical connection extending from said current-collecting device to said rotor, a portion of said connection being imbedded in said shaft, an auxiliary casing surrounding said current-collecting device, a removable cover for said auxiliary casing, a seal between said casings, and means for maintaining said seal in open position when said removable cover is in place.

5. In a dynamo-electric machine having a stator and a rotor, a main gas-proof casing surrounding said machine, a hollow shaft extending beyond said main casing, a current-collecting device on said shaft, an auxiliary casing surrounding said currnt-collecting device, a passage for cooling fluid between said casings, a diaphragm adapted to seal said passage, resilient means for biasing said diaphragm into sealing position, a removable cover for said auxiliary casing, and means for maintaining said diaphragm in open position when said cover is in place.

In testimony whereof, we have hereunto subscribed our names this 22nd day of January, 1931.

RENÉ A. M. BAUDRY.
CARL J. FECHHEIMER.